US008674574B2

(12) United States Patent
Hayslett et al.

(10) Patent No.: US 8,674,574 B2
(45) Date of Patent: Mar. 18, 2014

(54) ROTOR ASSEMBLY WITH COOLING MECHANISM

(75) Inventors: Steven Lee Hayslett, Troy, MI (US); Peter Bostwick, Rochester, NY (US); Edward L. Kaiser, Orion, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 334 days.

(21) Appl. No.: 13/075,478

(22) Filed: Mar. 30, 2011

(65) Prior Publication Data
US 2012/0248906 A1 Oct. 4, 2012

(51) Int. Cl.
*H02K 9/19* (2006.01)
(52) U.S. Cl.
USPC .................................. 310/156.57; 310/60 A
(58) Field of Classification Search
USPC ...................................... 310/60 A, 61, 156.57
See application file for complete search history.

(56) References Cited

U.S. PATENT DOCUMENTS

| | | | | |
|---|---|---|---|---|
| 3,571,634 A | * | 3/1971 | Sato et al. | 310/54 |
| 3,629,628 A | * | 12/1971 | Rank et al. | 310/54 |
| 6,657,333 B2 | * | 12/2003 | Shoykhet et al. | 310/61 |
| 6,879,069 B1 | * | 4/2005 | Weidman et al. | 310/61 |
| 7,705,503 B2 | * | 4/2010 | Takahashi et al. | 310/156.53 |
| 7,868,512 B2 | * | 1/2011 | Smith | 310/261.1 |
| 2009/0261667 A1 | * | 10/2009 | Matsubara et al. | 310/54 |
| 2010/0194220 A1 | * | 8/2010 | Tatematsu et al. | 310/61 |

* cited by examiner

*Primary Examiner* — Dang Le
(74) *Attorney, Agent, or Firm* — Quinn Law Group, PLLC

(57) ABSTRACT

A rotor assembly with a cooling mechanism having first and second channels is provided. The rotor assembly includes a shaft having a hollow portion and a rotor core having at least one rotor stack positioned at least partially around the shaft. The rotor core has a first end and a second end. The rotor stack forms an interior cavity which is only partially filled with a permanent magnet so as to define a gap in the rotor stack. The first channel is configured to direct fluid flow in a generally radial direction from the hollow portion of the shaft. The second channel is at least partially defined by the gap in the interior cavity of the rotor stack and is configured to direct the fluid flow from the first channel to at least one of the first and second ends of the rotor core.

17 Claims, 3 Drawing Sheets

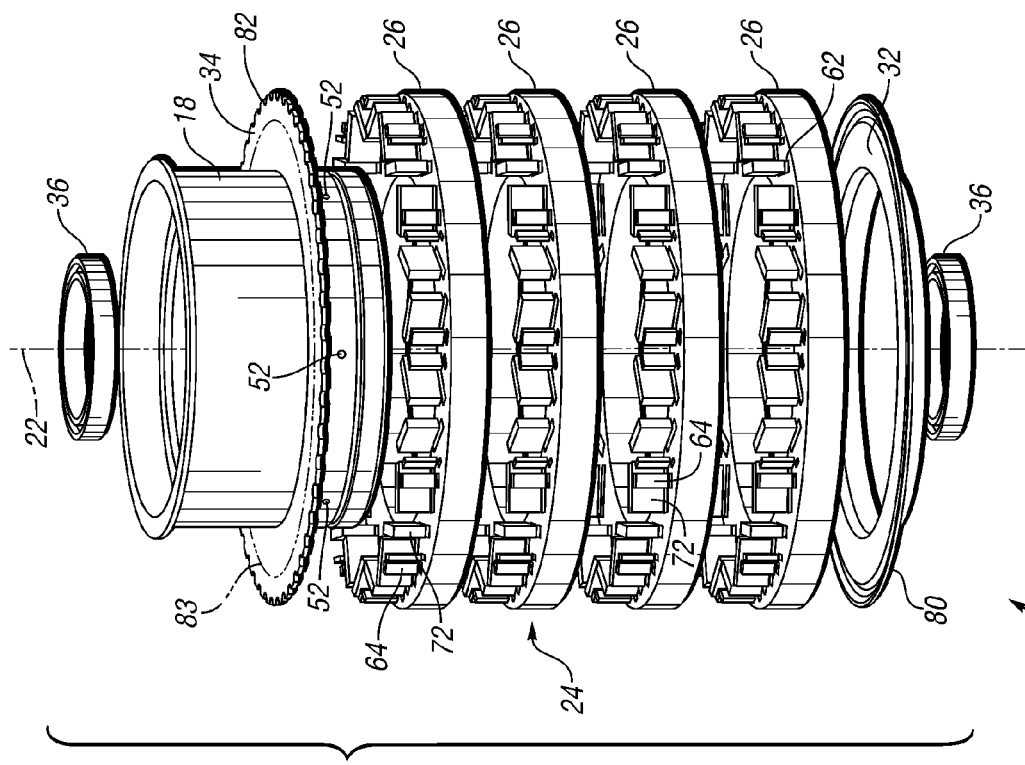
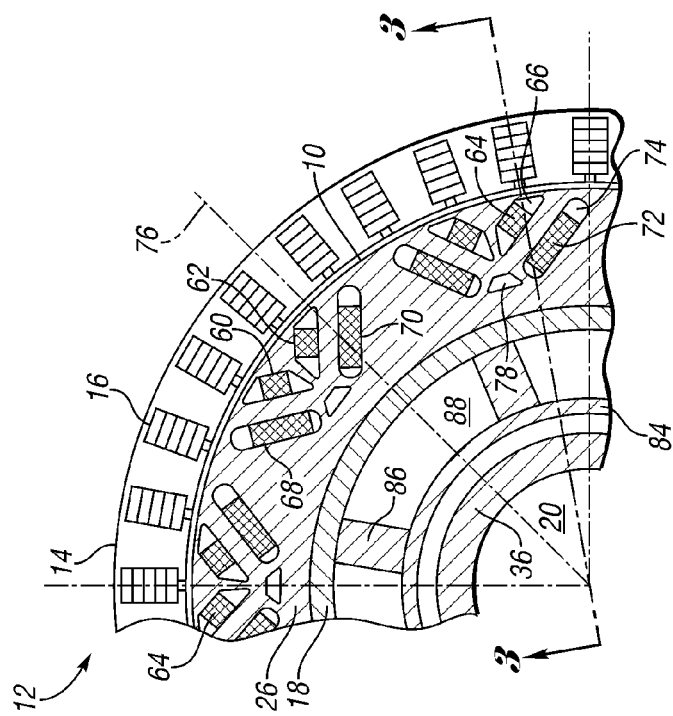
FIG. 2
FIG. 1

ROTOR ASSEMBLY WITH COOLING MECHANISM

TECHNICAL FIELD

The present invention relates generally to a rotor assembly of an electric machine, and more specifically, to a rotor assembly having a cooling mechanism.

BACKGROUND

An electric motor/generator generally includes a rotor assembly having a plurality of magnets of alternating polarity around the outer periphery of the rotor. The rotor is rotatable within a stator which generally includes a plurality of windings and magnetic poles of alternating polarity. In a generator mode, the rotation of the rotor causes the permanent magnets to pass by the stator poles and coils and thereby induce an electric current to flow in each of the coils. Alternately, if an electric current is passed through the stator coils, the energized coils will cause the rotor to rotate and thus the generator will perform as a motor. As with any energy conversion device, the motor/generators are less than 100 percent efficient, and reject some energy as heat. Efficient removal of this waste heat is desirable.

SUMMARY

A rotor assembly with a cooling mechanism having first and second channels is provided. The rotor assembly includes a shaft having a hollow portion and a rotor core having at least one rotor stack positioned at least partially around the shaft. The rotor core has a first end and a second end. The rotor stack forms an interior cavity which is only partially filled with a permanent magnet so as to define a gap in the rotor stack. A first channel is configured to direct fluid flow in a generally radial direction from the hollow portion of the shaft. A second channel is at least partially defined by the gap in the interior cavity of the rotor stack and is configured to direct the fluid flow from the first channel to at least one of the first and second ends of the rotor core. The first and second channels serve to cool the magnets to a lower operating temperature.

In one embodiment, a first end ring is operatively connected at the first end of the rotor core. The first end ring is spaced from the rotor core to define a gap extending radially and axially, referred to herein as a crevice. A hub aperture is created in the shaft and is configured to permit the fluid flow from the fluid feed through the hub aperture into the crevice. The first channel in this embodiment is defined by the fluid flow through the crevice via the hub aperture. The first channel intersects the second channel in the crevice.

In an alternative embodiment, an additional rotor stack is spaced apart from the at least one rotor stack in an axial direction by a defined spacing. A plate is positioned at least partially around the shaft and between the two rotor stacks. The plate includes spaced-apart first and second fingers defining a plate gap therebetween. A hub opening is formed in the hub and configured to at least partially overlap with the plate gap such that the fluid flow from the fluid feed enters the plate gap via the hub opening. The first channel is defined by the fluid flow from the fluid feed into the plate gap via the hub opening. The first channel intersects the second channel in the plate gap. The second channel includes a first fluid flow and a second fluid flow oriented in an opposite direction relative to the first fluid flow.

The above features and advantages and other features and advantages of the present invention are readily apparent from the following detailed description of the best modes for carrying out the invention when taken in connection with the accompanying drawings.

BRIEF DESCRIPTION OF THE DRAWINGS

FIG. 1 is a fragmentary schematic cross-sectional view of a portion of an electric motor/generator having a rotor assembly;

FIG. 2 is a schematic exploded view of the rotor assembly of FIG. 1;

DETAILED DESCRIPTION

Figure 3:
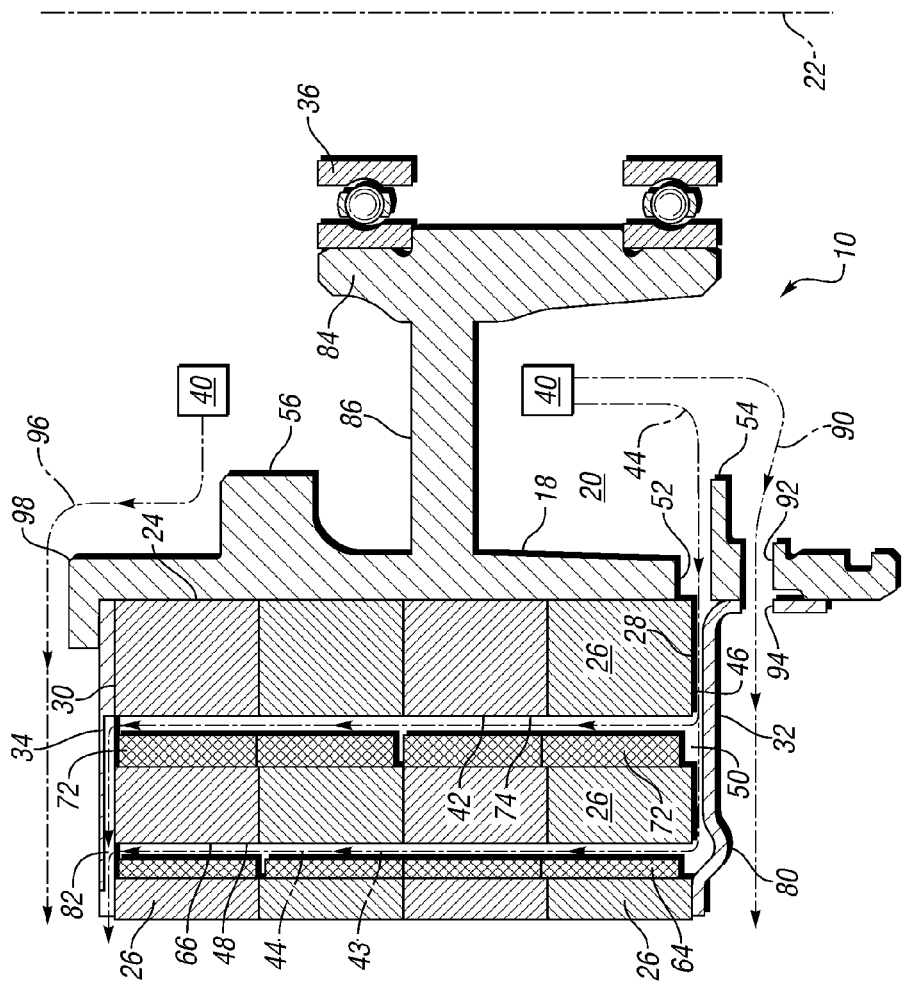
FIG. 3 is a fragmentary schematic cross-sectional view of the rotor assembly of FIG. 1, through axis 3-3 also shown in FIG. 1.

Referring to the Figures, wherein like reference numbers refer to the same or similar components throughout the several views, FIG. 1 shows a portion of an electric motor/generator 12 having a rotor assembly 10. The rotor assembly 10 is rotatable within a generally annular stator 14 having a plurality of windings 16. FIG. 2 is a schematic exploded view of the rotor assembly 10. FIG. 3 is a fragmentary schematic cross-sectional view of the rotor assembly 10. Referring to FIGS. 1-2, the rotor assembly 10 includes a shaft 18 having a hollow portion 20. The shaft 18 is longitudinally disposed and rotatable about a center axis 22 (shown in FIGS. 2-3). A rotor core 24 is positioned at least partially around the shaft 18. As illustrated in FIGS. 2-3, the rotor core 24 includes a plurality of rotor stacks 26. The rotor core 24 has a first end 28 and a second end 30. As illustrated in FIG. 2, a generally annular first end ring 32 is operatively connected to the first end 28 of the rotor core 24. A generally annular second end ring 34 is operatively connected to the second end 30 of the rotor core 24. Bearings 36 may be employed to support the rotor assembly 10.

A source of fluid, referred to herein as fluid feed 40, is positioned within the hollow portion 20 of the shaft 18 to supply cooling fluid for cooling the rotor assembly 10 and the electric motor/generator 12. The cooling fluid may be oil or any other suitable fluid. The fluid feed 40 may be an oil well, a device having a spray nozzle for spraying oil or any suitable device. If the rotor assembly 10 is being used in a vehicle, the cooling fluid may be oil coming from a gear set, clutch or other internal component of the vehicle transmission (not shown). More than one fluid feed 40 may be used, as shown in FIG. 3, depending on the particular application.

The rotor assembly 10 includes a cooling mechanism comprised of a first channel 46 and a second channel 48 that is in fluid communication with the first channel 46. Referring to FIG. 3, the first end ring 32 is spaced from the rotor core 24 to define a gap extending radially and axially, referred to herein as crevice 50, in between the first end ring 32 and rotor core 24. Referring to FIGS. 2-3, at least one hub aperture 52 is formed in the shaft 18 and configured to permit the fluid flow 44 from the fluid feed 40 through the hub aperture 52 into the crevice 50.

The first channel 46 is defined by the fluid flow 44 through the crevice 50 via the hub aperture 52. Thus, the first channel 46 is configured to direct fluid flow 44 in a generally radial direction from the hollow portion 20 of the shaft 18 to the first end 28 of the rotor core 24. Optionally, first and second walls 54, 56 may be formed extending away from the shaft 18. The first and second walls 54, 56 allow the cooling fluid to pool or collect together between the walls 54, 56. The first and second walls 54, 56 are positioned on either side of the hub aperture 52 and are configured to direct the fluid flow 44 into the hub aperture 52. The walls 54, 56 may have different axial thicknesses as shown in FIG. 3. The walls 54, 56 may also have different radial thicknesses. Flow rate through the hub aperture 52 is determined from flow equations based upon the diameter of the hub aperture 52, fluid pressure and axial location of the walls 54, 56, as will be well understood by those skilled in the art. Precise control of this flow rate allows for optimization of rotor cooling versus system efficiency (i.e., cooling requirements versus energy expended to deliver the cooling fluid and spin losses).

The rotor stack 26 of the rotor core 24 includes at least one interior cavity that defines a gap or pathway for the cooling fluid to flow. For example, the embodiment shown in FIG. 1 shows first and second interior cavities 60, 62 that are partially filled with magnets 64, defining gaps 66. The embodiment shown in FIG. 1 includes a second set of interior cavities 68, 70 are partially filled with magnets 72, defining gaps 74, and a fifth interior cavity 78, which does not contain a magnet. The number of interior cavities, magnets and their configuration may be selected by one of ordinary skill in the art based on the desired electrical machine performance. The interior cavities 60, 62, 68, 70 and the magnets 64, 72 within them may have different shapes and sizes. Optionally, the interior cavities 60, 62, 68, 70 may be symmetric with respect to an axis 76.

The second channel 48 is defined by the fluid flow 44 in the gaps 66, 74 of the interior cavities 60, 62, 68, 70 of the rotor core 24. Referring to FIG. 3, the second channel 48 includes a first flow 42 through gap 74 and a second flow 43 through gap 66. The first channel 46 intersects the second channel 48 in the crevice 50. The second channel 48 is configured to direct the fluid flow 44 from the first end 28 of the rotor core 24 to the second end 30 of the rotor core 24. Optionally, referring to FIG. 3, a rib portion 80 may be formed on a portion of the first end ring 32 radially outward of the shaft 18. The rib portion 80 strengthens the first end ring 32 and/or permits ease of flow.

In summary, for the rotor assembly 10, the fluid flow 44 from the feed 40 first travels through the first channel 46, defined by the hub aperture 52 and crevice 50. The fluid flow 44 then travels through the second channel 48, which includes a first flow 42 through gap 74 and a second flow 43 through gap 66, in the interior cavities 60, 62, 68, 70 of the rotor stack 26. The magnets 64, 72 are cooled by the fluid flow 44 in the gaps 66, 74, respectively. The fluid flow 44 then reaches the second end ring 34. In other words, the fluid flow 44 travels from the feed 40 to the first end 28 of the rotor core 24 and then onto the second end 30 of the rotor core 24.

Referring to FIGS. 2-3, the second end ring 34 of the rotor assembly may be formed with a plurality of cut-out portions 82 that are circumferentially distributed at a periphery of the second end ring 34. As shown in FIG. 3, the cut-out portions 82 at least partially align with the second channel 48 to allow the fluid flow 44 from the second channel 48 to exit the second channel 48 via the cut-out portions 82. Alternatively, a second end ring 34 having a reduced outer diameter 83 (shown in FIG. 2 in phantom) may be used in order to allow the fluid flow 44 from the second channel 48 to exit to a region radially outwards of the outer diameter 183. In other words, the outer diameter 83 is selected to be sufficiently small to expose at least a portion of the gaps 66, 74 and allow the cooling fluid to escape.

Optionally, referring to FIGS. 1 and 3, the rotor assembly 10 includes an inner shaft 84 concentrically within the shaft 18. In this case, the shaft 18 transmits torque to the gear set (not shown) it is attached to. The inner shaft 84 may be attached to the bearings 36. Spokes 86 extend radially between the shaft 18 and inner shaft 84 and define respective slots 88 between each pair of spokes 86.

Referring to FIG. 3, a first secondary fluid path 90 leads from the fluid feed 40 outwards of the first end ring 32 via respective holes 92, 94 in the shaft 18 and first end ring 32, respectively. Referring to FIG. 3, a second secondary fluid path 96 leads from the fluid feed 40 outwards of the second end ring 34 via an open end 98 of the assembly 10. The cooling fluid in the first and second secondary fluid paths 90, 96 may be thrown radially outward onto an inner diameter of the stator windings 16 (shown in FIG. 1), thereby cooling the stator windings 16.

Figure 4:
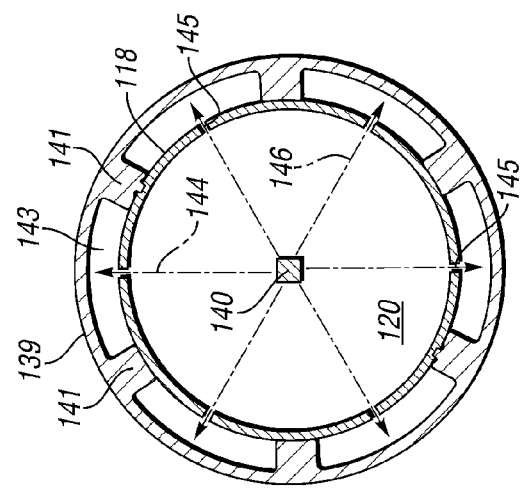
FIG. 4 is a schematic cross-sectional view of an alternative embodiment of a rotor assembly.
Figure 5:
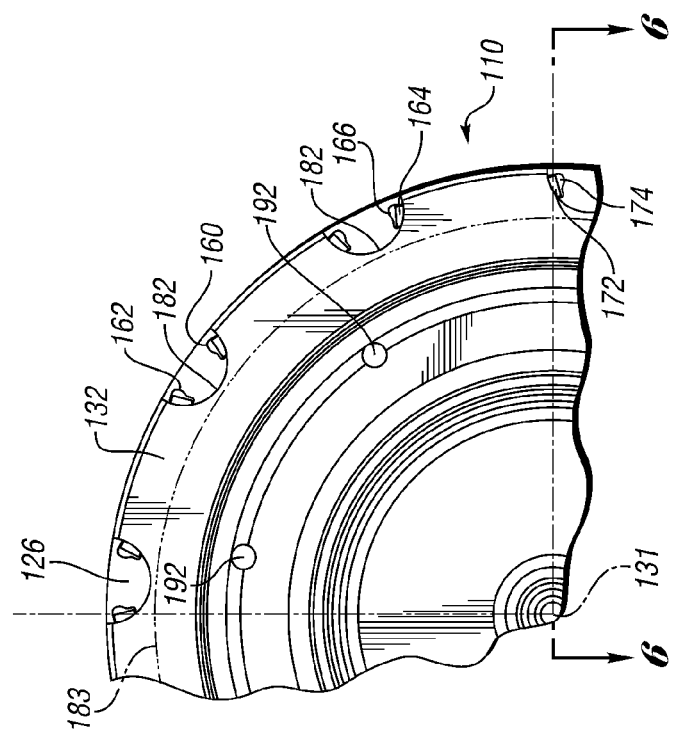
FIG. 5 is a fragmentary schematic end view of the rotor assembly of FIG. 4.
Figure 6:
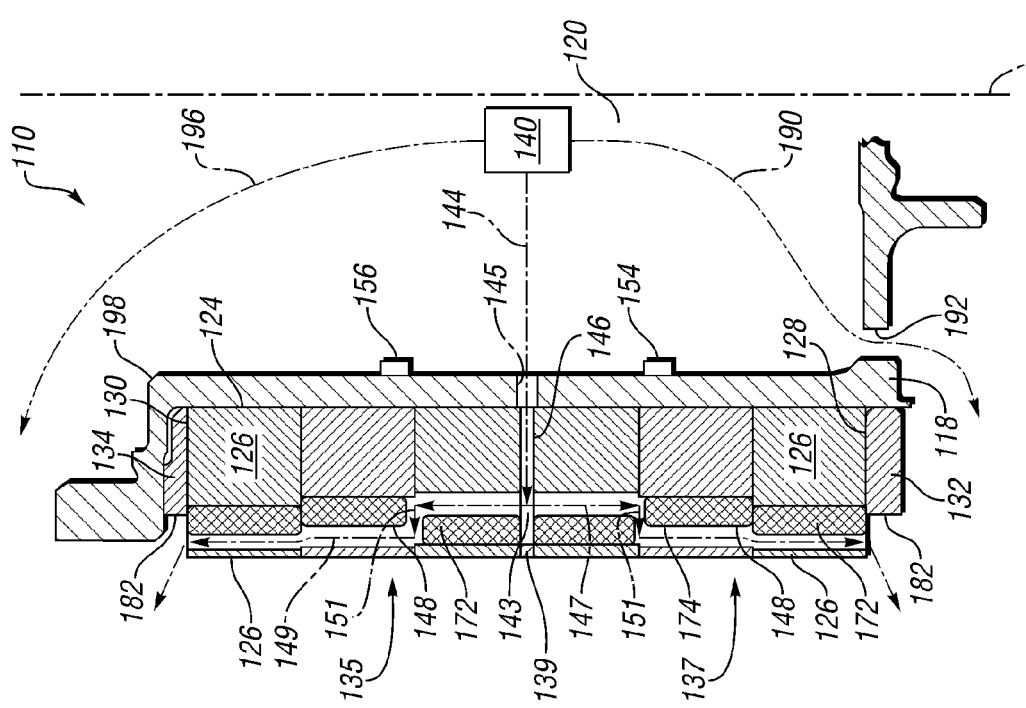
FIG. 6 is a fragmentary schematic cross-sectional view of the rotor assembly of FIGS. 4-5, through axis 6-6 shown in FIG. 5.

An alternative embodiment of a rotor assembly 110 is shown in FIGS. 4-6. Referring to FIGS. 4 and 6, the rotor assembly 110 includes a shaft 118 having a hollow portion 120. The shaft 118 is longitudinally disposed and rotatable about a center axis 122. Referring to FIG. 6, a rotor core 124 is positioned at least partially around the shaft 118 and includes a plurality of rotor stacks 126. The rotor core 124 has a first end 128 and a second end 130. As illustrated in FIG. 6, a first end ring 132 is operatively connected to the first end 128 of the rotor core 124. A second end ring 134 is operatively connected to the second end 130 of the rotor core. FIG. 5 is an end view of the rotor assembly 110 looking at a portion of the first end ring 132 and shaft 118. The first end ring 132 has a generally circular shape. The center axis 122 extends through the center 131 of the first end ring 132, out of the page. Also shown in FIG. 5 are cavities 160, 162 partially filled with magnets 164, 172, respectively, in the rotor stack 126 and defining gaps 166 and 174, respectively. The rotor assembly 110 may include multiple cavities that are partially unfilled, similar to that shown in FIG. 1. Any suitable configuration of cavities and magnets may be used.

Referring to FIG. 6, the rotor core 124 includes a first core portion 135 separated from a second core portion 137 in an axial direction by a defined spacing, in order to allow a plate 139 to be placed in between the first and second core portions 135, 137. The plate 139 is made of a non-magnetic material. For example, the plate 139 may be made of stainless steel, a polymer, fiberglass composite or other suitable materials. Optionally, the plate 139 may be composed of a material that is a poor or low conductor of electricity, in order to minimize eddy current losses. In one example, the plate 139 has an axial thickness of approximately 1 mm. Referring to FIG. 4, the plate 139 includes a plurality of spaced-apart fingers 141 defining a plate gap 143 between each pair of fingers 141. Each of the core portions 135, 137 has at least one rotor stack 126 each. A plurality of rotor stacks 126 are shown in FIG. 6. Optionally, as shown in FIG. 6, the rotor stacks 126 may be skewed relative to each other.

Referring to FIGS. 4 and 6, a fluid feed 140 is placed within the hollow portion 120. More than one fluid feed 140 may be used, depending on the application. Fluid flow 144 travels from the fluid feed 140 through a first channel 146 configured to direct fluid flow 144 in a generally radial direction from the hollow portion 120 of the shaft 118. At least one hub opening 145 is formed in the shaft 118 and configured to at least partially overlap with the plate gap 143 so that the fluid flow 144 from the fluid feed 140 enters the plate gap 143 via the hub opening 145.

Referring to FIGS. 5-6, a first channel 146 is defined by the fluid flow 144 from the fluid feed 140 into the plate gap 143 via the hub opening 145. Referring to FIG. 6, a second channel 148 is configured to direct the fluid flow 144 from the first channel 146 to both of the first and second ends 128, 130 of the rotor core 124. The first channel 146 intersects the second channel 148 in the plate gap 143. In the plate gap 143, the fluid flow 144 splits into a first fluid flow 147 to the first end 128 of the rotor core, and a second fluid flow 149 to the second end 130 of the rotor core 124. As shown in FIG. 6, the second fluid flow 149 is oriented in an opposite direction relative to the first fluid flow 147. The first and second fluid flow 147, 149 flows in the gaps 166 and 174 in the interior cavities 160, 162 of the rotor stack 126. The magnets 164, 172 are cooled by the fluid flow 144. Optionally, the magnets 164, 172 may be aligned to the left or right of the cavities 160, 162, respectively. Optionally, the magnets 164, 172 may be positioned in the middle of the cavities 160, 162, respectively, to allow fluid flow 144 to flow along all sides of the magnets 164, 172. Referring to FIG. 6, a portion 151 of the fluid flow 144 in the second channel 148 may flow in a generally radial direction between adjacent rotor stacks 126. As noted above, optionally, the rotor stacks 126 may be skewed relative to each other, resulting in the step pattern shown in FIG. 6. Even if the rotor stacks 126 are not skewed relative to each other, there may be a radial component to the fluid flow 144 due to the cooling fluid being thrown to the axially outermost portion of the gaps 166 and 174 when the rotor assembly 110 spins.

Optionally, first and second walls 154, 156 may be formed extending away from the shaft 118. The first and second walls 154, 156 allow the cooling fluid to pool or collect together between the walls 154, 156. The first and second walls 154, 156 are positioned on either side of the hub opening 145 and configured to direct the fluid flow 144 into the hub opening 145. The walls 154, 156 may have different axial and/or radial thicknesses. Flow rate through the hub opening 145 is determined from flow equations based upon the diameter of the hub opening 145, fluid pressure and axial location of the walls 154, 156, as will be well understood by those skilled in the art. Precise control of this flow rate allows for optimization of rotor cooling versus system efficiency (i.e., cooling requirements versus energy expended to deliver the cooling fluid and spin losses).

Referring to FIGS. 5-6, the first and second end rings 132, 134 may include a plurality of notches 182 circumferentially distributed at a periphery of the respective first and second end rings 132, 134. The plurality of notches 182 at least partially align with the second channel 148 such that the fluid flow 144 exits the second channel 148 via the plurality of notches 182 in the first and second end rings 132, 134. Alternatively, the first and/or second end rings 132, 134 may be selected with a reduced outer diameter 183 (shown in FIG. 5 in phantom), in order to allow the fluid flow 144 from the second channel 148 to exit to a region radially outwards of the outer diameter 183. In other words, the outer diameter 183 is selected to be sufficiently small to expose at least a portion of the gaps 166, 174 and allow the cooling fluid to escape.

Referring to FIG. 6, a first secondary fluid path 190 leads from the fluid feed 140 outwards of the first end ring 132 via a hole 192 (also shown in FIG. 6) in the shaft 118. A second secondary fluid path 196 leads from the fluid feed 140 outwards of the second end ring 134 via an open end 198 of the assembly 110. The cooling fluid in the first and second secondary fluid paths 190, 196 may be thrown radially outward onto an inner diameter of the stator windings 16 (shown in FIG. 1), thereby cooling the stator windings 16.

In summary, in one embodiment (the rotor assembly 10 shown in FIGS. 1-3) the fluid flow 44 travels from the fluid feed 40 to the first end 28 of the rotor core 24 and then onto the second end 30 of the rotor core 24. In an alternative embodiment (the rotor assembly 110 shown in FIGS. 4-6) the fluid flow 144 travels from a fluid feed 140 into a plate gap 143 created by placing a plate 139 between first and second core portions 135, 137 of the rotor core 124. The fluid flow 144 breaks into two paths, a generally axial first flow 147 to the first end 128 of the rotor core 124 and an opposite generally axial second flow 149 to the second end 130 of the rotor core 124.

While the best modes for carrying out the invention have been described in detail, those familiar with the art to which this invention relates will recognize various alternative designs and embodiments for practicing the invention within the scope of the appended claims.

The invention claimed is:

1. A rotor assembly comprising:
a shaft having a hollow portion;
a rotor core having at least one rotor stack positioned at least partially around the shaft, the rotor core having a first end and a second end;
wherein the rotor stack forms a first interior cavity, the first interior cavity being only partially filled so as to define a gap in the first interior cavity;
a second end ring operatively connected to the second end of the rotor core;
a plurality of cut-out portions circumferentially distributed at a periphery of the second end ring;
a fluid feed positioned within the hollow portion of the shaft and configured to distribute a fluid defining a fluid flow;
a cooling mechanism having:
a first channel configured to direct the fluid flow in a generally radial direction from the hollow portion of the shaft;
a second channel in fluid communication with the first channel and at least partially defined by the gap in the first interior cavity;
wherein the second channel is configured to direct the fluid flow from the first channel to at least one of the first and second ends of the rotor core; and
wherein the plurality of cut-out portions at least partially intersects with the second channel to allow the fluid flow to exit the second channel via the plurality of cut-out portions.

2. The assembly of claim 1, further comprising a permanent magnet partially filling the first interior cavity in the rotor stack.

3. The assembly of claim 1, further comprising:
a second interior cavity in the rotor stack; and
wherein the second channel includes a first fluid flow through the first interior cavity in the rotor stack and a second fluid flow through the second interior cavity in the rotor stack.

4. The assembly of claim 1, further comprising:
a first end ring operatively connected at the first end of the rotor core, the first end ring being spaced from the rotor core to define a crevice therebetween;
a hub aperture formed in the shaft and configured to permit the fluid flow from the fluid feed through the hub aperture into the crevice; and
wherein the first channel is defined by the fluid flow through the crevice via the hub aperture.

5. The assembly of claim 4, wherein the first channel intersects the second channel in the crevice between the first end ring and the first end of the rotor core.

6. The assembly of claim 4, further comprising:
first and second walls extending away from and circumferentially around the shaft; and
wherein the hub aperture is located between the first and second walls, the first and second walls being configured to direct the fluid flow into the hub aperture.

7. The assembly of claim 4, further comprising a rib portion formed on a portion of the first end ring radially outward of the shaft.

8. The assembly of claim 4, further comprising:
a first secondary fluid path leading from the fluid feed axially outwards of the first end ring via respective holes in the shaft and first end ring.

9. The assembly of claim 4, further comprising:
a second secondary fluid path leading from the fluid feed axially outwards of the second end ring via an open end of the assembly.

10. The assembly of claim 1, further comprising:
an inner shaft placed concentrically within the shaft;
at least two spaced-apart spokes extending radially between the shaft and the inner shaft.

11. A rotor assembly comprising:
a shaft having a hollow portion;
a rotor core having at least one rotor stack positioned at least partially around the shaft, the rotor core having a first end and a second end;
wherein the rotor stack forms a first interior cavity, the first interior cavity being only partially filled so as to define a gap in the first interior cavity;
a fluid feed positioned within the hollow portion of the shaft and configured to distribute a fluid defining a fluid flow;
a second rotor stack spaced apart from the at least one rotor stack in an axial direction by a defined spacing;
a plate positioned at least partially around the shaft and between the two rotor stacks, wherein the plate includes spaced-apart first and second fingers defining a plate gap therebetween;
a hub opening formed in the hub and configured to at least partially overlap with the plate gap such that the fluid flow from the fluid feed enters the plate gap via the hub opening; and
a cooling mechanism having:
a first channel configured to direct the fluid flow in a generally radial direction from the hollow portion of the shaft, the first channel being defined by the fluid flow from the fluid feed into the plate gap via the hub opening; and
a second channel in fluid communication with the first channel and at least partially defined by the gap in the first interior cavity, the second channel being configured to direct the fluid flow from the first channel to at least one of the first and second ends of the rotor core.

12. The assembly of claim 11, wherein the second channel includes:
a first fluid flow; and
a second fluid flow oriented in an opposite direction relative to the first fluid flow.

13. The assembly of claim 11, further comprising:
a first end ring operatively connected to the first end of the rotor core;
a plurality of notches circumferentially distributed at a periphery of the first end ring;
wherein the plurality of notches at least partially aligns with the second channel such that the fluid flow exits the second channel via the plurality of notches in the first end ring.

14. The assembly of claim 11, further comprising:
a second end ring operatively connected to the second end of the rotor core, the second end ring having an outer diameter sufficiently small to permit the fluid flow from the second channel to escape to a region radially outwards of the outer diameter of the second end ring.

15. The assembly of claim 11, further comprising:
a third rotor stack adjacent to the second rotor stack;
wherein a portion of the fluid flow in the second channel flows in a generally radial direction between the second rotor stack and third rotor stack.

16. An electric motor comprising:
a stator;
a rotor mounted within the stator, the rotor including a shaft with a hollow portion;
a rotor core having at least one rotor stack positioned at least partially around the shaft, the rotor core having a first end and a second end;
a fluid feed positioned within the hollow portion of the shaft and configured to distribute a fluid defining a fluid flow;
a cooling mechanism configured to permit the fluid flow from the fluid feed to at least one of the first and second ends of the rotor core;
wherein the cooling mechanism includes a first channel fluidly connected to a second channel, the first channel allowing the fluid flow in a generally radial direction and the second channel allowing the fluid flow in a generally axial direction;
at least one interior cavity formed in the rotor stack, the interior cavity being only partially filled so as to define a gap in the interior cavity of the rotor stack;
wherein the second channel is defined by the fluid flow through the gap in the interior cavity of the rotor stack;
a second end ring operatively connected to the second end of the rotor core;
a plurality of cut-out portions circumferentially distributed at a periphery of the second end ring;
wherein the plurality of cut-out portions at least partially intersects with the second channel to allow the fluid flow to exit the second channel via the plurality of cut-out portions.

17. The motor of claim 16, further comprising:
an inner shaft placed concentrically within the shaft;
at least two spaced-apart spokes extending radially between the shaft and the inner shaft.

* * * * *